US005123722A

United States Patent [19]

Meymand

[11] Patent Number: 5,123,722

[45] Date of Patent: Jun. 23, 1992

[54] DECORATIVE GLASS

[76] Inventor: Darlene K. Meymand, 12622 Carnation Duvall Rd., NE., Duvall, Wash. 98019

[21] Appl. No.: 556,883

[22] Filed: Jul. 20, 1990

[51] Int. Cl.[5] ........................ G02B 17/00; G02B 27/00

[52] U.S. Cl. ........................................ 359/592; 359/619

[58] Field of Search ............... 350/258, 259, 129, 167, 350/168, 322; 362/326, 330, 339, 311, 806; 355/71

[56] References Cited

U.S. PATENT DOCUMENTS

| | | | |
|---|---|---|---|
| 586,216 | 7/1897 | Basquin | 350/259 |
| 2,985,062 | 5/1961 | Clapp | 355/71 |
| 3,068,754 | 12/1962 | Benjamin | 350/127 |
| 3,195,592 | 6/1885 | Magrath | 350/259 |
| 3,829,680 | 8/1974 | Jones | 362/339 |
| 4,114,982 | 9/1978 | Buckley | 350/127 |

FOREIGN PATENT DOCUMENTS 10574 of 1886 United Kingdom .

*Primary Examiner*—Richard A. Wintercorn

[57] ABSTRACT

A sheet of decorative glass for forming an artistic light pattern on a surface proximate to the glass. One surface of the glass sheet comprises a plurality of facets, each of which is associated with several other facets so as to form a projecting section. Each of said facets is designed to refract incident light so as to form a light pattern having a discrete, readily observable geometric pattern. Under certain lighting conditions, the light pattern will include a color distribution comprising some or all of the visible color spectrum.

22 Claims, 3 Drawing Sheets

DECORATIVE GLASS

FIELD OF THE INVENTION

The present invention relates to light-refracting glass, and more particularly to sheets of decorative glass designed to refract incident light so as to form an artistic light pattern on a surface proximate to the glass.

BACKGROUND OF THE INVENTION

The use of decorative glass in houses and other structures is well known. Such decorative glass includes stained or leaded glass windows of the type comprising a plurality of tinted and clear pieces of glass arranged in an artistic pattern. In some cases, the peripheral edge of one or more of the pieces of glass is beveled.

Under certain light conditions, light rays intersecting the beveled portions of discrete glass pieces of a stained glass window will be refracted so as to form "light patterns" on a surface, e.g., a wall, positioned near the window. As used herein, "light patterns" refers to visually discernible patterns formed on a surface by a light-refracting device. Such patterns are often slightly darker than the surface on which they are projected, and under certain circumstances such patterns may have an intense, dazzling appearance. Under certain circumstances such patterns may have an intense, dazzling appearance. Under certain conditions, the light patterns formed by discrete glass pieces of a stained glass window may include all or a portion of the visible color spectrum. Light patterns of the type formed by known stained glass windows typically lack any identifiable pattern and often include discrete light portions which are separated from one another. Thus, the overall effect of the light patterns formed by known stained glass windows is typically characterized by disarray and absence of recognizable shapes and patterns.

Glass and other sheets of transparent material have been used in window openings, as well as in conjunction with artificial lighting fixtures, to diffuse light incident thereon or to refract and transmit incident light which would otherwise be reflected. For instance, U.S. Pat. Nos. 595,273, 1,277,065, and 1,669,663 disclose light-refracting sheet glass designed to refract, and transmit as diffused light, the light rays intersecting the outer surface of the glass. Such glass includes a plurality of concave or convex sections arranged in a regular geometric pattern on one surface of the glass. In addition, the glass sheet disclosed in U.S Pat. No. 595,273 is apparently designed to provide such diffusion without producing the dazzling effect which occurs when light is refracted by a conventional prism. U.S. Pat. No. 2,859,334 discloses a transparent louver designed for diffusing light emitted by a fluorescent lighting fixture. One embodiment of the louver comprises a series of four-sided pyramid-like projections arranged in a regular geometric pattern, with each of the projections being surrounded by an upstanding wall. To obtain satisfactory diffusion of the light generated by the associated fluorescent lighting fixture, each of the projections is about 0.375-inch square. It is also known to provide corrugated transparent sheet material for the purpose of refracting light incident on one surface thereof so that objects will appear distorted when viewed through one side of the sheet of material, as disclosed in U.S. Pat. No. 1,886,445.

Thus, known stained glass windows and known transparent sheets of material for refracting light intersecting the material so as to diffuse the light are not designed for producing artistic light patterns comprising geometric shapes arranged in discernible order on a surface proximate to the window or sheet.

OBJECTS AND SUMMARY OF THE INVENTION

One object of the present invention is to provide a sheet of decorative glass designed to refract incident light so as to produce a light pattern comprising regular geometric shapes on the surface of a wall proximate to the glass.

Another object of the present invention is to provide a sheet of decorative glass for refracting light incident thereon so as to produce a plurality of color patterns arranged in regular geometric order on a wall positioned adjacent the glass.

These and other objects are achieved by a sheet of decorative glass comprising a smooth outer surface and a faceted opposite surface. The latter includes a plurality of projecting sections arranged in regular geometric order. Each of the sections includes a plurality of planar facets. The size and shape of each of the facets, as well as the angular inclination of the surface plane of the facets relative to the opposite, smooth surface of the sheet, are selected so that incident light transmitted through the glass will be refracted at the interface of each of the facets with the surrounding atmosphere so as to form a plurality of geometric light patterns arranged in regular order on a surface such as a wall near, but spaced from, the glass. When the incident light intersects the outer surface of the glass at certain intensity levels and angular inclination, the geometric light patterns will include a color distribution comprising some or all of the visible light color spectrum.

DETAILED DESCRIPTION OF THE INVENTION

Figure 1:
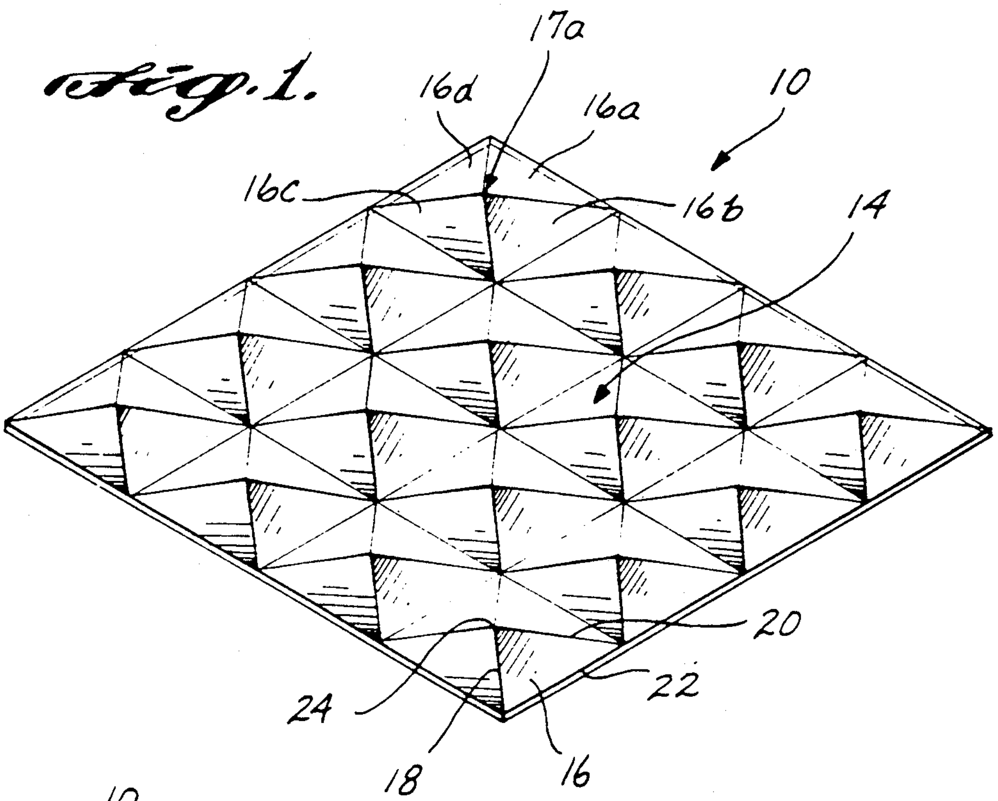
FIG. 1 is a perspective view of the faceted side of the decorative glass sheet of the present invention.

Referring to FIGS. 1-4, the present invention is a sheet 10 of decorative glass for forming a plurality of geometric light and color patterns on a surface proximate to the glass. Sheet 10 comprises a smooth surface 12 and a faceted opposite surface 14. Typically, sheet 10 is installed in an exterior window opening in a house or other structure, although under certain circumstances it may be desirable to install sheet 10 in a window opening in an interior wall. Sheet 10 is typically installed in a vertical mode. However, under certain conditions it may be desirable to install sheet 10 so that its outer surface 12 is positioned at an angle to the vertical, e.g., when sheet 10 is installed in a roof skylight. To provide a projection surface for the desired light patterns, the window opening in which sheet 10 is disposed should be positioned near, i.e., 5 to 20 feet away from, a surface such as a wall. Ideally, the projection surface should have a light color, extend parallel to surface 12 of sheet 10, and be smooth. Preferably, sheet 10 is installed so that surface 12 is on the outside, i.e., exposed to incident light.

Decorative glass sheet 10 is preferable made from a sheet of glass having a refractive index which is highly uniform throughout the entire sheet. Additionally, sheet 10 preferably has a relatively high refractive index, e.g., a refractive index ranging from 1.50 to 1.70. In this connection, leaded crystal optical glass or water white crown optical glass may be satisfactorily employed as the starting material from which sheet 10 is fabricated. However, when it is not important that the light pattern formed by sheet 10 have a predictable pattern, or when it is not important that the light pattern include color, glass 10 may be made from a sheet of glass having a refractive index as low as 1.45, e.g., conventional plate glass. Sheet 10 may also be made from a synthetic polymer such as polycarbonate, although the light pattern produced by such a sheet will typically not be as clearly defined as that produced when sheet 10 is made from optical glass. Additionally, when sheet 10 is made from a synthetic polymer, the sheet will often cloud with time as a consequence of the reaction of the synthetic polymer with light. Sheet 10, when made from glass, may be fabricated using a conventional milling or grinding machine. Conventional molding processes may be used to fabricate sheet 10 using synthetic polymers.

To achieve the desired light and color paterns, as discussed hereinafter, it is preferred that sheet 10 be at least 0.25 inch thick at its portions of greatest thickness, i.e., those portions of faceted surface 14 spaced the greatest distance from smooth surface 12. However, sheet 10 may be somewhat thinner than 0.25 inch at its thickest portions when less than optimal light and color patterns are acceptable. Sheet 10 may be significantly thicker than 0.25 inch at its thichest portions, for instance, up to an inch or more in thickness, with the upper end of the thickness range being limited by cost and weight of the glass from which sheet 10 is fabricated. To ensure sheet 10 has sufficient rigidity and structural integrity, it is important that the thinnest portion of the sheet be sufficiently thick. For instance, when sheet 10 is made from optical glass, the thinnest portions thereof should have a thickness of at least 0.175 inch.

Faceted surface 14 is defined by a plurality of facets 16, each of which is associated with several other facets so as to form a projecting section 17. For instance, projecting section 17*a* includes facets 16*a*, 16*b*, 16*c*, and 16*d* (see FIG. 1). It is preferred projecting sections 17 be positioned in regular geometric order across sheet 10, although under certain circumstances it may be desirable to position sections 17 randomly across the sheet. As discussed hereinafter, the specific size and configuration of projecting sections 17 will vary as a function of the size, configuration, and angular inclination of facets 16.

Figure 2:
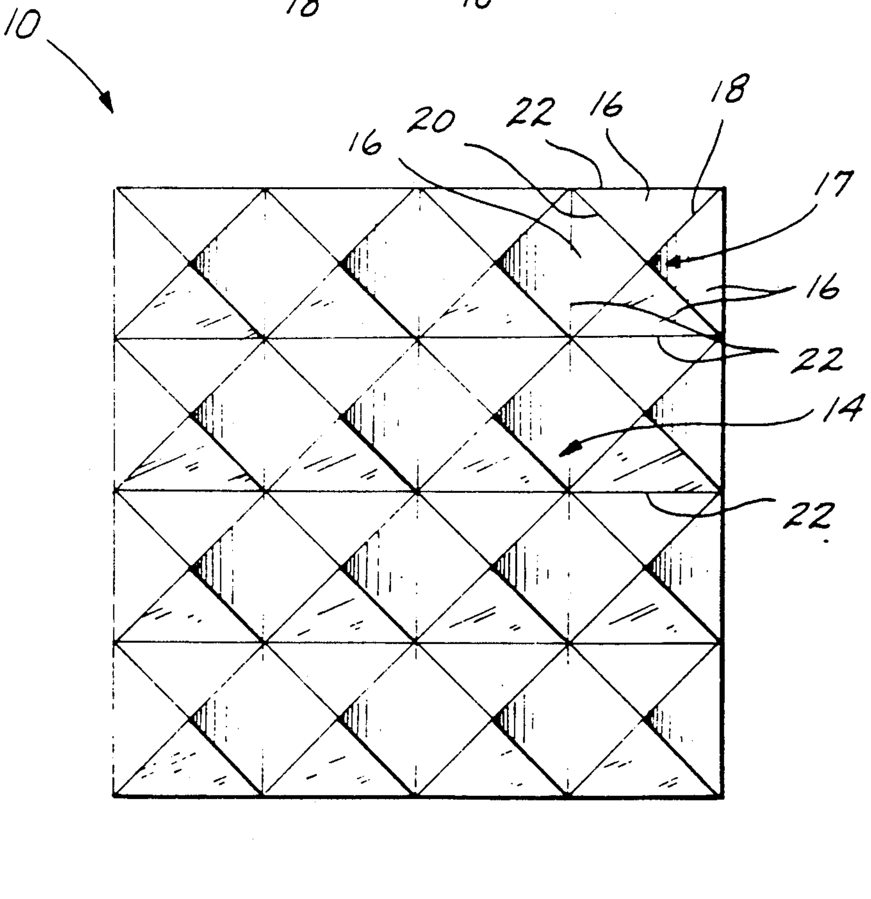
FIG. 2 is a plan view of the faceted side of the glass sheet shown in FIG. 1.
Figure 3:
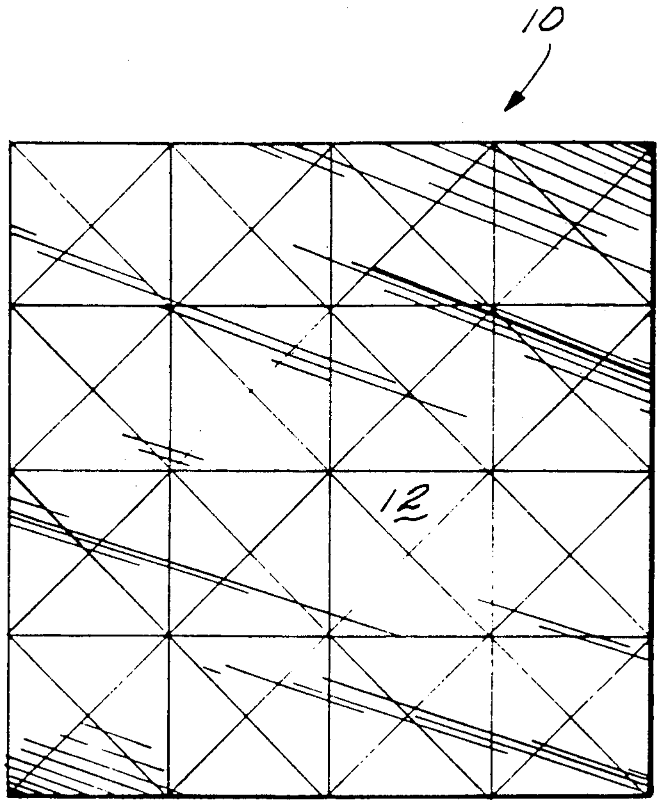
FIG. 3 is a plan view of the opposite, smooth side of the glass sheet illustrated in FIG. 1.

Each of the facets 16 is planar and defines an interface surface where incident light is refracted, as discussed in greater detail below. As viewed in plan (see FIGS. 1 and 2), facets 16 preferably have a triangular configuration, although other polygonal configurations may also be employed. When facets 16 have a triangular configuration, the triangle defined by the facet may have an equilateral, isosceles, or other configuration. The number, relative length, and angular relation of the sides of facets 16 may vary depending upon the desired light pattern to be produced by glass 10, as discussed in greater detail hereinafter. The bottom edges of the facets, e.g., bottom edges 22 of the triangular facets 16 shown in FIG. 2, may extend either perpendicular or parallel to the edges of sheet 10, as shown in FIG. 2, or may extend transversely to the side edges (not shown).

To achieve artistically satisfactory light patterns, it is important that the surface area of each facet 16 be significantly larger than the surface area of the facets of known transparent sheets of material designed to diffuse light intersecting the material. Thus, it is preferred that each facet 16 have a planar interface surface area of at least 0.45 square inch. Ideally, the surface area of facets 16 ranges from 1.75 to 4 square inches, with even larger surface areas being acceptable when sheet 10 is fabricated from relatively thick, i.e., more than 1-inch thick, glass sheet. In an exemplary embodiment of the present invention, each facet 16 had an equilateral triangle configuration, and each of the sides of the triangle is 2.875 inches long. Thus, the total surface area of such facets 16 is about 3.565 inches.

Figure 4:
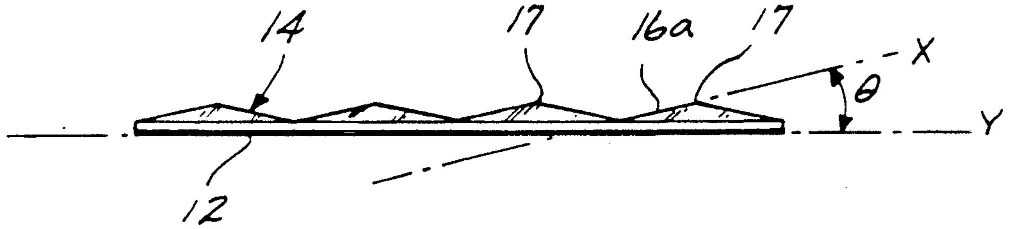
FIG. 4 is an end view of the decorative glass sheet in FIG. 1.
Figure 5:
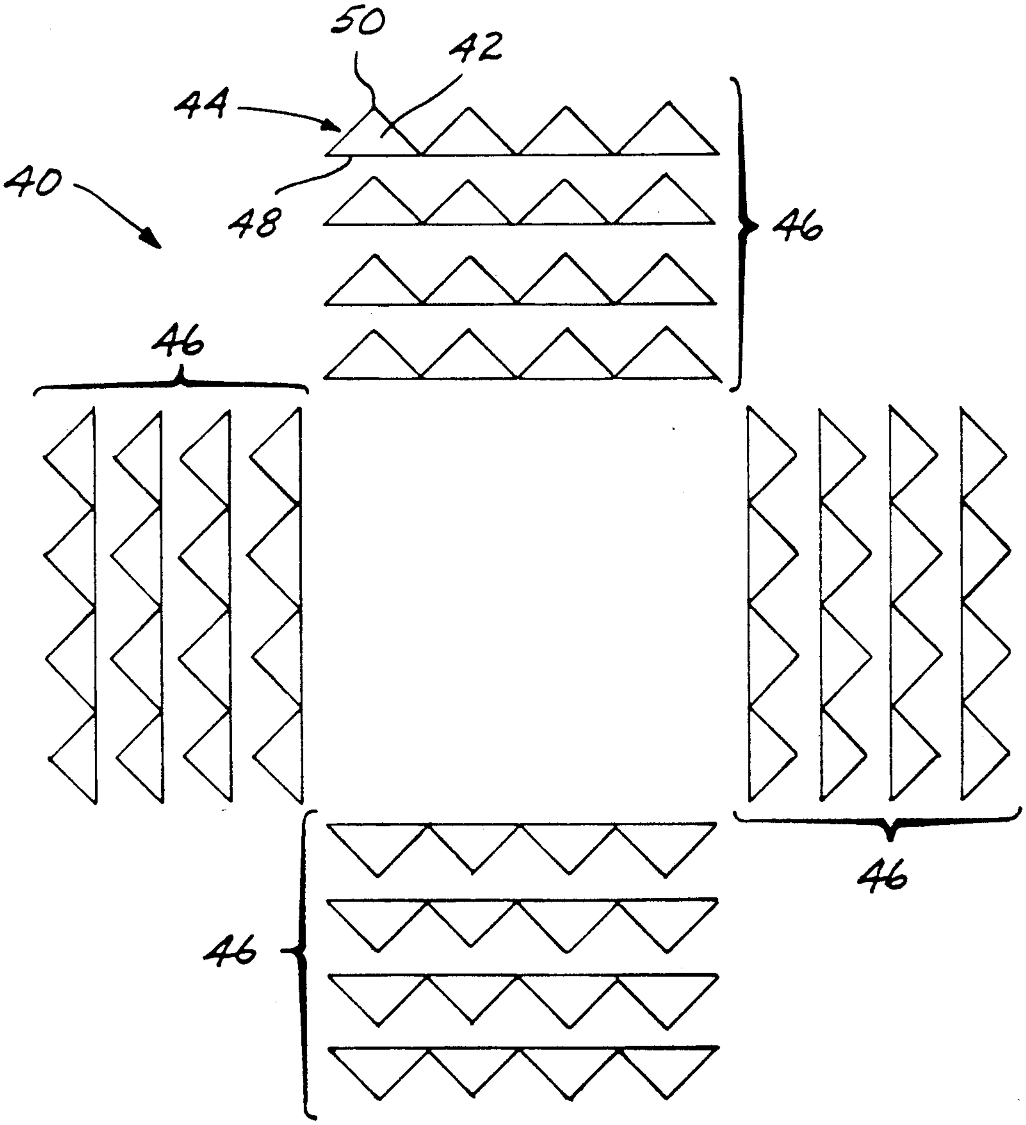
FIG. 5 is an idealized side elevational view of a geometric light pattern which will be transmitted by the decorative glass sheet of the present invention onto a surface proximate to the glass under certain lighting conditions.

The plane along which each facet 16 extends is inclined a predetermined angle $\theta$ (see FIG. 4) relative to the plane along which smooth surface 12 extends. For instance, as shown in FIG. 4, facet 16*a* extends along plane X which is inclined at an angle $\theta$ relative to the plane Y along which smooth surace 12 extends. Dependinng upon the angular inclination of facets 16 relative to smooth surface 12, and the angular inclination of the light intersecting surface 12, either noncolored light patterns or colored light patterns, as described in greater detail hereinafter, will be projected by sheet 10 onto an adjacent surface. When it is desirable to form only light patterns without color, each facet 16 may be formed so that the inclination angle $\theta$ (see FIG. 4) thereof ranges from as little as 1° up to about 10°. When it is desired that the light patterns formed by sheet 10 have color disposed therein, the facets 16 should be inclined so that angle $\theta$ is at least 10°. Depending upon the original thickness of sheet 10 and the size of facets 16, the latter may be inclined so that angle $\theta$ is as great as about 20°. Of course, the surface area of facets 16 and the inclination angle $\theta$ of facets 16 are limited by the thickness of the glass from which sheet 10 is fabricated. Consequently, a sheet 10 having relatively large facets, i.e., facets having a surface area greater than about 4 square inches, and relatively large facet inclination angle $\theta$, i.e., greater than about 14°, must be fabricated from relatively thick glass, e.g., glass having a thickness of 0.75 inch or more. Preferably, all of the facets 16 in a given sheet 10 are inclined at identical inclination angles $\theta$. However, under certain circumstances it may be desirable to incline certain facets 16 in a given sheet 10 at one inclination angle $\theta$ and one or more other groups of facets at different inclination angles.

The embodiment of glass sheet 10 shown in FIGS. 1-4 exemplifies one set of facet design parameters encompassed by the present invention. The sheet 10 of this exemplary embodiment was made from a sheet of water white crown optical glass having refractive index of 1.57. Prior to the formation of faceted surface 14, sheet 10 had a thickness of 0.5 inch. Sheet 10 includes sixteen projecting sections 17 which are arranged in 4×4 configuration. Each projecting section 17 comprises four facets 16, each of which has an equilateral triangle configuration, with side edges 18 and 20 and bottom edge 22 of the facets each being 2.875 inches in length. Thus, each sheet 10 includes 64 facets 16. Each of the four facets 16 of each projecting section 17 has an inclination angle $\theta$ of 12°, whereby each section 17 has a convex, four-sided pyramidal configuration. Thus, for each projecting pyramidal section 17, the facets 16 thereof are positioned relative to one another so that the apexes 24 of the facets join one another, and the bottom edges 22 of the facets of the section 15 are arranged so as to define a square, when viewing the section 17 in plan, measuring 2.875 inches on a side.

In the embodiment of sheet 10 illustrated in FIGS. 1–4, the sheet has a thickness of about 0.194 inch, as measured at the thinnest portion thereof (e.g., at the bottom edge 22 of each of the facets 16), and the distance between the apex of the pyramidal sections 17 and smooth surface 12, as measured along an axis extending perpendicular to smooth surface 12, is 0.306 inch. The bottom edges 22 of the facets 16 of one pyramidal section 17 are contiguous with the bottom edges of adjacent pyramidal sections, or the edges of sheet 10, as the case may be, and the bottom edges of the facets extend either parallel or perpendicular to the side edges of sheet 10, as the case may be.

Referring now to FIGS. 1–5, the specific light and color pattern formed by sheet 10 will vary significantly depending upon the number and arrangement of projecting sections 17, and the size, configuration, number, and inclination angle ↓ of the facets 16 in the projecting sections, and the intensity and angular relation of the light intersecting surface 12 of sheet 10. However, by way of example, when the decorative glass sheet 10 illustrated in FIGS. 1–4 and described above is installed in the vertical position in an exterior window opening positioned about 10 feet away from a vertically extending wall, with the window opening being positioned to received southern sun exposure, a light pattern 40 similar to the one illustrated in FIG. 5 will be formed on the wall during certain times of the day. Light pattern 40 comprises a plurality of readily discernible triangular shapes 42 which have an intense, dazzling appearance. Triangular shapes 42 are arranged in groups of four in rows 44. Each 44 row of triangular shapes 42 is positioned in a group 46 comprising four rows of triangular shapes positioned one on top of the other. Light pattern 40 includes four groups 46, each of which is positioned in mutually orthogonal relation to adjacent group. Thus, under satisfactory light conditions, light pattern 40 includes 64 discrete triangular shapes 42, one for each of the facets 16 in sheet 10. The specific size of triangular shapes 42 will vary depending upon the intensity and angular inclination of the light intersecting surface 12. However, under one set of light conditions, triangular shapes 42 had a substantially equilateral triangle configuration, with the sides of the triangular shape each measuring about 5 inches in length.

Depending upon the intensity and angular inclination of the incident light, i.e., the light intersecting surface 12, facets 16 may disperse the incident light so that one or more of the triangular shapes 42 will include a color distribution disposed within the periphery thereof comprising some or all of the visible color spectrum. Under optimal conditions, the entire visible color spectrum will be present in each triangular shape, with the red end of the spectrum being positioned adjacent the base 48 of the triangular shape 42, the purple end of the spectrum being positioned adjacent the apexes 50 of the shapes 42, and the intermediate colors being positioned in between. Under less than optimal light conditions, none, or only a portion, of the color spectrum will be present in triangular shapes 42.

As the intensity and angle of inclination of the incident light changes, one or more of the shapes 42, rows 44 of shapes 42, or even groups 46 of rows 44 may disappear. Furthermore, rows 44 will move radially toward or away from one another as a function of the intensity and angular inclination of incident light. In addition, the size of the discrete shapes 42 will change with changes in the intensity and angular inclination of incident light.

Light pattern 40 is created by sheet 10 in accordance with well-known optical principles. Thus, light intersecting smooth surface 12 at less than the critical angle is refracted at the interface (i.e., surface 12) betweem sheet 10 and the surrounding atmosphere and transmitted through sheet 10 toward faceted surface 14. As those of ordinary skill in the art will appreciate, the critical angle for a given sheet 10 will vary depending on the refractive indices of the sheet and the surrounding atmosphere. Light rays which have been transmitted through sheet 10 so as to intersect the facets 16 of surface 14 at less than the critical angle will be refracted at the facets, each of which constitutes a planar interface surface, and transmitted out of sheet 10 toward the wall or other surface positioned near the sheet. Light rays intersecting interface facets 16 at greater than the critical angle will be reflected back into sheet 10 and ultimately refracted at either surface 12 or 14 so as to pass out of sheet 10, or absorbed by the frame surrounding the edges of the sheet.

Sheet 10 will disperse the light intersecting surface 12, which light typically includes the entire color spectrum, into discrete colors as a function of the wavelength of the light rays in the incident light. Such dispersion occurs as a consequence of the refraction described above, and will occur to a greater or lesser extend depending upon the size and inclination angle $\theta$ of facets 16, and the intensity and angle of inclination of light intersecting surface 12.

An important advantage of the glass sheet 10 of the present invention, as compared to transparent sheets of material designed to diffuse incident light and comprising a plurality of small facets (i.e., facets having a surface area of less than about 0.45 square inch), is that the light pattern formed by sheet 10 comprises readily discernible, relative large, discrete light patterns which have an intense, dazzling appearance. The light patterns formed by known transparent sheets of material, on the other hand, generally have either a uniform, diffused appearance, or comprise discrete pinpoints of light lacking discernible geometric shapes and having a "busy," aesthetically unpleasing appearance.

Since certain changes may be made in sheet 10 without departing from the scope of the present invention, it is intended that all matter contained in the above description or shown in the accompanying drawings shall be interpreted in an illustrative and not in a limiting sense.

The embodiments of the invention in which an exclusive property or privilege is claimed are defined as follows:

1. A light-transmissive sheet of glass comprising a first planar surface and a second surface opposite said first surface, said second surface comprising a plurality of facets, each of which (a) is inclined at an angle ranging from 1° to 20° relative to said first surface and (b) has a surface area of at least 0.45 square inch.

2. A sheet of glass according to claim 1, wherein said sheet has a refractive index which lies in the range from 1.45 to 1.7.

3. A sheet of glass according to claim 2, wherein said sheet is at least 0.175 inch thick at its thinnest portion.

4. A sheet of glass according to claim 1, wherein each of said facets is triangular in configuration and comprises two sides edges, a bottom edge, and an apex.

5. A sheet of glass according to claim 4, wherein each of said plurality of facets is associated with three other facets so as to form a projecting section, further wherein each of said facets is sized, configured, and arranged so that each of said projecting sections has a four-sided pyramidal configuration.

6. A sheet of glass according to claim 5, wherein said projecting sections are arranged in regular geometric order.

7. A sheet of glass according to claim 4, wherein said sheet includes four side edges, and said bottom edges of said facets extend either parallel or perpendicular to said side edges.

8. A sheet of glass according to claim 4, wherein said sheet includes four side edges, and said bottom edges of said facets extend transversely to said side edges.

9. A sheet of glass according to claim 1, wherein said sheet is made from leaded crystal optical glass.

10. A sheet of glass according to claim 1, wherein said sheet is made from water white crown optical glass.

11. A sheet of glass according to claim 4, wherein each of said facets has an equilateral triangle configuration.

12. A sheet of glass according to claim 4, wherein each of said facets has an isosceles triangle configuration.

13. A sheet of glass according to claim 11, wherein said side edges and bottom edge of each said facets is about 2 to 3 inches in length and each of said facets is inclined at about 12° to 16° relative to said first surface.

14. A decorative sheet of glass for refracting incident light so as to form an artistic glass pattern on a surface proximate to said sheet, said sheet of glass comprising:

a first surface;

a second surface positioned opposite said first surface, said second surface comprising refraction means forming an integral part of said sheet for refracting light which has been transmitted through said sheet via said first surface so as to intersect said second surface at less than the critical angle associated therewith so that said light refracted by said refraction means will form a pattern on a surface proximate to said sheet, said pattern comprising a plurality of bright, sharply defined geometric forms; and further wherein said sheet of glass has a refractive index of 1.57 to 1.62.

15. A sheet according to claim 14, wherein said refraction means additionally disperses said light intersecting said second surface at less than said critical angle so that one or more of said geometric forms includes at least a portion of the visible light color spectrum.

16. A sheet according to claim 14, wherin said refraction means comprises a plurality of planar facets, each of which is inclined at a predetermined angle relative to said first surface.

17. A sheet according to claim 16, further wherein said refraction means is designed to form said pattern so that the latter includes one discrete geometric form for each of said facets when light intersecting said first surface has a suitable intensity and angular relation with said first surface.

18. A sheet according to claim 16, wherein each of said facets is inclined at an angle ranging from 1° to 20° relative to said first surface.

19. A sheet according to claim 14, wherein said refraction means is designed to form said pattern so that said plurality of geometric forms is arranged in regular geometric order.

20. A sheet according to claim 14, wherein said refraction means is designed to form said pattern so that said geometric forms have a triangular configuration.

21. A sheet according to claim 2, wherein said sheet has a refractive index in the range 1.57 to 1.62.

22. A sheet according to claim 1, wherein said plurality of facets are an integral part of said sheet.

* * * * *

UNITED STATES PATENT AND TRADEMARK OFFICE

CERTIFICATE OF CORRECTION

PATENT NO. : 5,123,722

DATED : June 23, 1992

INVENTOR(S) : D.K. Meymand

It is certified that error appears in the above-identified patent and that said Letters Patent is hereby corrected as shown below:

| | | |
|---|---|---|
| 1 | 26-28 | After "appearance." delete "Under certain circumstances such patterns may have an intense, dazzling appearance." |
| 2 | 45 | After "sheet" insert --shown-- |
| 3 | 8 | "preferable" should read --preferably-- |
| 3 | 32 | "paterns" should read --patterns-- |
| 4 | 30 | "surace" should read --surface-- |
| 4 | 30 & 31 | "Dependinng" should read --Depending-- |
| 4 | 63 | After "having" insert --a-- |
| 5 | 30 | "angle ↓" should read --angle θ-- |
| 5 | 38 | "received" should read --receive-- |
| 5 | 44 | "44 row" should read --row 44-- |
| 5 | 48 | "group" should read --groups-- |

UNITED STATES PATENT AND TRADEMARK OFFICE

CERTIFICATE OF CORRECTION

PATENT NO. : 5,123,722

DATED : June 23, 1992

INVENTOR(S) : D.K. Meymand

It is certified that error appears in the above-identified patent and that said Letters Patent is hereby corrected as shown below:

| COLUMN | LINE | |
|---|---|---|
| 5 | 67 | "shape 42" should read --shapes 42-- |
| 6 | 17 | "betweem" should read --between-- |
| 6 | 40 | "extend" should read --extent-- |
| 6 | 49 | "relative" should read --relatively-- |
| 7 | 39 | After "each" insert --of-- |
| 8 | 20 | "wherin" should read --wherein-- |

Signed and Sealed this

Nineteenth Day of October, 1993

*Attest:*

BRUCE LEHMAN

*Attesting Officer*

*Commissioner of Patents and Trademarks*